3,274,274
ADAMANTANE PROCESS
Harold E. Cupery, Wilmington, Del., assignor to E. I. du Pont de Nemours and Company, Wilmington, Del., a corporation of Delaware
No Drawing. Filed Dec. 16, 1964, Ser. No. 418,890
3 Claims. (Cl. 260—666)

This application is a continuation-in-part of my application Serial No. 331,956, filed December 19, 1963.

This invention relates to a process for preparing adamantane.

More particularly, it is directed to an improved process for making adamantane by the isomerization of trimethylenenorbornane with aluminum trichloride and hydrochloric acid comprising maintaining process conditions at atmospheric pressure and at 70° to 120° C. for one to four hours while agitating trimethylenenorbornane with 0.1 to 0.7 mole of hydrochloric acid and 0.4 to 0.95 mole of aluminum chloride per mole of trimethylenenorbornane.

Processes for making adamantane are well known in the art. However, these processes generally produce low yields or in the alternative must use such high temperatures and pressures that the cost of adamantane becomes prohibitively high. As an example, an article by Paul von R. Schleyer and M. M. Donaldson, J.A.C.S., 82, 4645 (1960), shows the conversion to adamantane by the reaction of trimethylenenorbornane with anhydrous aluminum halide and an acid. Their process produces only an 18% yield of adamantane. This process specifically involves the isomerization of trimethylenenorbornane with aluminum bromide and sulfuric acid. The experimenters attempted to use aluminum chloride in place of the bromide but as pointed out on page 4647, column 1 in the last whole paragraph, "The best yield of pure, sublimed adamantane, 18.8%, was obtained using a large amount of AlBr$_3$ catalyst, with sec-butyl bromide promoter, and HBr co-catalyst and stirring at room temperature for two days." Plainly the experimenters suggest that the aluminum chloride is a less desirable catalyst. The extreme length of time required to obtain the adamantane, two days, at only an 18.8% yield obviates any commercial utility for the process.

A year after the Schleyer article, H. Koch and J. Franken, Brennstoff Chem., 42, 90 (1961), reported a 42% yield of adamantane obtained by reacting tetrahydrodicyclopentadiene, also called trimethylenenorbornane, with aluminum chloride and hydrochloric acid at temperatures of 120° to 125° C. and at a hydrogen pressure of 40 atmospheres, for 3½ hours. Although Koch and Franken indicated that a 42% yield was obtained this process is costly and hard to duplicate in view of the high pressure involved.

I have discovered that through the use of aluminum chloride and hydrochloric acid reacted with trimethylenenorbornane at atmospheric pressure and at 70° to 120° C. for one to four hours a 45% by weight yield of adamantane based on the starting trimethylenenorbornane is produced. This process has the advantage of low cost and reliability while at the same time producing better yields of adamantane.

My process involves two steps and consists of the hydrogenation of dicyclopentadiene to a mixture of exo- and endo-trimethylenenorbornane followed by isomerization to adamantane using aluminum chloride and hydrochloric acid.

In the first step, commercial dicyclopentadiene is placed under hydrogen pressure of 100 to 1500 pounds per square inch in the presence of a nickel-on-kieselguhr catalyst containing 60 to 65% nickel for three to four hours at 80° to 150° C.

The hydrogenation time depends on the cooling system and the degree of agitation and specifically, the type of equipment and temperature of the cooling water. Under normal conditions, three to four hours will be sufficient. The amount of catalyst used is 0.2 to 2.0 pounds per 100 pounds of dicyclopentadiene. The product is a liquid above about 70° C. This liquid is filtered hot to remove the used catalyst. The product is a mixture of exo- and endo-trimethylenenorbornane.

The next step is carried out immediately on the molten product. Alternatively, it can be stored for later use. If the product is allowed to cool, it will of course solidify. If it is desired to keep it liquid at lower temperatures, an "antifreeze" agent can be added. I have found that relatively small amounts of selected organic solvents, preferably hydrocarbons, are very effective in reducing the freezing point of the hydrogenate. Thus, 16% by weight of hexane reduces the freezing point to about 5° C., and allows convenient handling as a liquid at room temperature. The "antifreeze" can be left in during the next (isomerization) reaction. However, best results are obtained if it is removed by distillation before the next reaction.

To carry out the isomerization reaction, 0.4 to 0.95 mole of anhydrous AlCl$_3$ per mole of trimethylenenorbornane is added to the molten trimethylenenorbornane and the mixture is agitated while the system is kept saturated with HCl. Good agitation is required to obtain a good yield of adamantane. The temperature is maintained at 70° to 120° C., preferably at 75° to 85° C. The reaction is complete in one to four hours.

I have found that it is very important to keep the mixture saturated with HCl during the reaction, and that the HCl concentration is particularly important during the initial stage. Best results are obtained if the addition of HCl is started as soon as the AlCl$_3$ addition is begun and the HCl is fed rapidly until saturation is reached. Once the mixture is saturated, the HCl addition rate can be reduced. I have found that the system dissolves about 0.1 to 0.5 mole of HCl per mole of trimethylenenorbornane, depending on the temperature. Somewhat more HCl is added if necessary to maintain an atmosphere over the system.

While I prefer to use anhydrous HCl, I have found that it can be replaced with ordinary aqueous hydrochloric acid, or even with water, if the amount of AlCl$_3$ is adjusted suitably. It is well known that AlCl$_3$ reacts with water to give HCl. As a rule of thumb, I add from 0.1 to 0.5 mole of additional AlCl$_3$ per mole of water introduced.

HCl in excess of that required to saturate the system and maintain an HCl atmosphere in the reactor will, of course, escape through the vent. Excess HCl is therefore merely a nuisance and has no effect on the reaction. Thus, in an appropriately sized reactor, I add about 0.1 to 0.3 mole of anhydrous HCl per mole of trimethylenenorbornane. If I use aqueous HCl I add an amount equivalent, in moles of H$_2$O and HCl combined, to 0.1 to 0.7 per mole of trimethylenenorbornane and I also add 0.1 to 0.5 mole of extra AlCl$_3$ per mole of water introduced.

I have found that 0.4 to 0.6 mole of AlCl$_3$ used with anhydrous HCl co-catalyst provides excellent yields of adamantane. If I use aqueous co-catalyst, I increase the charge of AlCl$_3$ by 0.1 to 0.5 mole per mole of water, so that the total AlCl$_3$ used with aqueous co-catalyst can be as much as 0.95 mole per mole of trimethylene norbornane.

After reaction is complete the reaction mixture is cooled to approximately 70° C. and extracted with hexane. I have found that hexane is a very selective solvent for adamantane and that two or three batchwise extractions remove virtually all the product from the reaction mass. I prefer to use a volume of hexane approximately equal to that of the trimethylenenorbornane starting material. In a particularly preferred embodiment of my process the more dilute hexane solutions from the later extractions are recycled to extract subsequent batches and thus reduce the amount of distillation required. Alternatively, the extractions can be carried out as a continuous countercurrent operation.

The hexane dissolves the adamantane, leaving tar and inorganics behind. It is important to note that water is not used to break up complexes of aluminum chloride or to dissolve salts in this procedure. Use of water at this stage lowers the yield, causes problems in handling, and is generally detrimental to the process. However, I have found it advantageous to wash the hexane extract after decantation with small quantities of water to remove traces of aluminum chloride entrained due to imperfect phase separation. Any such water must itself be carefully drained off after treating the extract. The hexane is distilled from the extracts and can be reused. The resulting product is a slurry of adamantane crystals in by-product organic liquids. The adamantane is isolated by filtration and washing.

I have found it is particularly advantageous to add an alcohol such as methanol or isopropyl alcohol to the slurry before filtration. This technique gives a good recovery of very pure adamantane. Yields are 35 to 42%. After drying, an additional 2 to 5% can be recovered from the filtrate.

The following example is presented in addition to the examples described above to more fully describe this invention. All percents are by weight unless otherwise indicated.

*Example 1*

A. *Hydrogenation of dicyclopentadiene.*—A 100-gallon pressure hydrogenation vessel is charged with 450 pounds of dicyclopentadiene and 2 pounds of Girdler No. 49 catalyst (60–65% nickel-on-kieselguhr). Hydrogen is bubbled through the bottom of the reactor until the pressure is 1000 pounds per square inch while heat is applied through an internal coil. As the temperature reaches 60° C., cooling is started and the temperature is allowed to rise to 115° C. A hydrogen pressure of 900–1000 pounds per square inch is maintained for one and a half hours while the heat of reaction is dissipated at 110–120° C. by circulating water through the coil. Finally the system is held for one hour at 100° C. while the hydrogen pressure is increased to 1500 p.s.i.

The hydrogenated product is then cooled to 90° C. and filtered to remove the used catalyst. The weight of trimethylenenorbornane is 419 pounds. Infrared and ultraviolet scans show no evidence of residual olefin.

B. *Isomerization of trimethylenenorbornane to give adamantane. Use of anhydrous HCl.*—A 50-gallon agitated vessel fitted with a reflux condenser and a jacket is charged with 158 pounds of trimethylenenorbornane at a temperature of 95° C. Seventy-eight pounds of anhydrous aluminum chloride is then added. A stream of anhydrous hydrogen chloride is fed below the liquid surface at a rate of 3 pounds per hour. Agitation is started and the system is heated to a temperature of 107° C. Then cooling is applied and the reaction temperature is maintained at 110–112° C. for 3 hours.

The hydrogen chloride feed is then shut off and the system is cooled to 75° C. Then 138 pounds of n-hexane is charged to the vessel and the system is heated to reflux at a pot temperature of 76–77° C. The system is held at reflux for 10 minutes. Then the agitation is stopped and the system is allowed to stand for 15 minutes whereupon it separates into two phases.

The upper layer is transferred to a 100-gallon agitated vessel fitted with a total take-off condenser. The 50-gallon vessel containing the lower layer is charged with 83 pounds of n-hexane. The system is agitated and again heated to reflux at a pot temperature of 67–68° C. After agitating at reflux for 10 minutes the agitation is stopped and the two phase system is allowed to settle for 15 minutes. The upper layer is transferred to the previously used 100-gallon vessel.

The hexane extracts successively charged into the 100-gallon vessel are agitated and heated to distill off substantially all the hexane solvent. Then the system is cooled to 22° C. and filtered. The solids are slurried with 33 pounds of methanol and filtered. The filter cake is washed with 33 pounds of methanol and dried. The weight of the adamantane obtained is 49.9 pounds. By vapor-phase chromatography the product is found to be 99% pure adamantane. In a sealed capillary its melting point is 260° C.

C. *Isomerization of trimethylenenorbornane to give adamantane. Use of anhydrous HCl.*—A 50-gallon agitated vessel fitted with a reflux condenser and a jacket is charged with 158 pounds of trimethylenenorbornane at a temperature of 80° C. Seventy-eight pounds of anhydrous aluminum chloride is then added. A stream of anhydrous hydrogen chloride is fed below the liquid surface at a rate of 5 pounds per hour. Agitation is started and the system is held at a temperature of 80–88° C. Cooling is required, especially during the first hour, to maintain the reaction temperature. At the end of one hour the hydrogen chloride feed rate is reduced to 2 pounds per hour and gentle heating is necessary to maintain the reaction temperature. After a total of 3 hours of reaction time the hydrogen chloride feed is shut off and the system is cooled to 75° C. Then 138 pounds of n-hexane is charged to the vessel and the system is heated to reflux at a pot temperature of 76–77° C. The system is held at reflux for 10 minutes. Then the agitation is stopped and the system is allowed to stand for 15 minutes, whereupon it separates into two phases. The upper layer is transferred to a 100-gallon agitated vessel fitted with a total take-off condenser. The lower layer is re-extracted with 120 pounds of n-hexane and this extract is combined with the first extract.

The hexane extracts are agitated and heated to distill substantially all of the hexane, the pot temperature being carried up to 115° C. at atmospheric pressure. Then the residue is cooled to 22° C. and 33 pounds of methanol is added. The mixture is stirred well and then filtered. The filter cake is washed twice with 33 pounds of methanol each time and dried. The weight of the adamantane obtained is 63.2 pounds (40% yield). By vapor-phase chromatography it is found to be 99% pure. In a sealed capillary its melting point is 260° C. Vapor-phase chromatographic analysis of the combined methanol filtrates indicates the presence of an additional 7.9 pounds (5% by weight) of adamantane.

D. *Isomerization of trimethylenenorbornane to give adamantane. Use of aqueous HCl.*—In a process essentially identical with the previous run (C.), the AlCl₃ is raised to 105 pounds and instead of anhydrous HCl, 13.5 pounds of 37% aqueous hydrochloric acid is charged at a rate of 7.3 pounds per hour for the first hour and 3.1 pounds per hour for the remaining two hours. After the isolation, 66.3 pounds of adamantane, 42% by weight, is obtained. The methanol filtrates are combined, concentrated and cooled to −70° C. Filtration gives an additional 2.8 pounds of adamantane, 1.8% by weight.

The invention claimed is:

1. In a process for preparing adamantane by the isomerization of trimethylenenorbornane with AlCl₃ and HCl the improvement of maintaining process conditions at atmospheric pressure and at 70° to 120° C. for one to four hours while agitating trimethylenenorbornane with 0.1 to 0.7 mole of hydrochloric acid and 0.4 to 0.95 mole of aluminum chloride per mole of trimethylenenorbornane to yield a reaction mixture containing adamantane.

2. The process according to claim 1 wherein the reaction mixture is extracted with hexane and the hexane extract is concentrated to yield a slurry of crude adamantane.

3. The process according to claim 2 wherein methanol is admixed with the slurry of crude adamantane and the solids from the resulting mixture are filtered out to yield a pure adamantane product.

References Cited by the Examiner

UNITED STATES PATENTS 2,937,211  5/1960  Ludwig _____ 260—666
3,128,316  4/1964  Schneider _____ 260—666

OTHER REFERENCES

Paul von R. Schleyer et al., J. Am. Chem. Soc., 82, pp. 4641–4645, 1960.

Raymond C. Fort, Jr., et al., Chem. Rev., 64, No. 3, pp. 277–300, June 1964.

H. Stetter, Ang. Chem., 66, pp. 217–229, 1954.

H. Stetter, Ang. Chem., 74, pp. 361–374, 1962.

Von Herbert Koch et al., Brennstoff-Chemie, Bd. 42, p. 90, 1961.

DELBERT E. GANTZ, *Primary Examiner.*

V. O'KEEFE, *Assistant Examiner.*